United States Patent
Alkahlan

(10) Patent No.: US 12,274,598 B1
(45) Date of Patent: Apr. 15, 2025

(54) DENTAL APPLIANCE

(71) Applicant: KING SAUD UNIVERSITY, Riyadh (SA)

(72) Inventor: Lama Ahmed Alkahlan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/527,930

(22) Filed: Dec. 4, 2023

(51) Int. Cl.
*A61C 7/18* (2006.01)

(52) U.S. Cl.
CPC .......... *A61C 7/18* (2013.01); *A61C 2201/007* (2013.01)

(58) Field of Classification Search
CPC ....... A61C 7/18; A61C 2201/007; A61C 7/12; A61C 7/10
See application file for complete search history.

(56) References Cited

U.S. PATENT DOCUMENTS

| | | | | |
|---|---|---|---|---|
| 3,127,677 A * | 4/1964 | Schachter | ................ | A61C 7/12 433/17 |
| 3,525,153 A * | 8/1970 | Gerber | ................ | A61C 7/00 433/21 |
| 3,593,421 A * | 7/1971 | Brader | ................ | A61C 7/20 433/21 |
| 3,936,938 A * | 2/1976 | Northcutt | ................ | A61C 7/12 433/21 |
| 4,197,643 A * | 4/1980 | Burstone | ................ | A61C 7/12 420/420 |
| 4,571,178 A * | 2/1986 | Rosenberg | ................ | A61C 7/10 433/7 |
| 5,064,370 A * | 11/1991 | Jones | ................ | A61C 7/00 433/21 |
| 5,429,501 A * | 7/1995 | Farzin-Nia | ................ | A61C 7/00 433/21 |
| 5,505,616 A * | 4/1996 | Harwell | ................ | A61C 7/00 433/21 |
| 5,645,422 A * | 7/1997 | Williams | ................ | A61C 7/10 433/7 |
| 6,964,566 B2 * | 11/2005 | Sapian | ................ | A61C 7/10 433/21 |
| 7,018,202 B2 * | 3/2006 | Teramoto | ................ | A61C 7/22 433/21 |
| 7,094,051 B2 * | 8/2006 | Williams | ................ | A61C 7/36 433/7 |
| 7,837,468 B2 | 11/2010 | Teng | | |
| 11,246,682 B1 * | 2/2022 | Jolley | ................ | A61C 7/36 |
| 2004/0265769 A1 * | 12/2004 | Inman | ................ | A61C 7/00 433/21 |

FOREIGN PATENT DOCUMENTS

RU          2783146 C1     11/2022

* cited by examiner

*Primary Examiner* — Ralph A Lewis
(74) *Attorney, Agent, or Firm* — Nath, Goldberg & Meyer; Joshua B. Goldberg

(57) ABSTRACT

The present disclosure is directed to a dental appliance. The dental appliance includes a first band adapted for mounting about a first tooth, such as a second molar, the first band having a mesial hook facing toward a root of the first tooth. A second band is included, the second band adapted for mounting about a second tooth, such as a premolar, wherein the second band has a distal hook facing toward a crown of the second tooth. A spring is secured to, and extends between, the distal and mesial hooks. The spring may be a nickel titanium coil spring and have a length of about 13 mm. Other embodiments include a supportive rigid bar, a bi-lateral arrangement, and a method of applying the dental appliance.

18 Claims, 4 Drawing Sheets

DENTAL APPLIANCE

BACKGROUND

Field

The disclosure of the present patent application relates to dentistry, and particularly to a dental appliance for uprighting a tilted molar.

Description of Related Art

One of the most common situations which can be seen in dental clinics is the presence of a mesially tipped mandibular second molar. This clinical situation can be explained by a lack of presence of mandibular first molars, which are the earliest permanent teeth to erupt into the oral cavity. Because the mandibular first molars are the earliest arriving permanent teeth, they are often susceptible to caries (also known as tooth decay or dental cavities) and typically lost early after practice of poor oral hygiene measures. Studies have shown that the mandibular first permanent molar was the most commonly extracted tooth in the oral cavity. The early loss of the permanent first molars may cause mesial tilting of the second permanent molars and even the third molars, along with other complications such as distal movement of canines and premolars or extrusion and super-eruption of the opposing tooth.

Numerous oral health issues can result from a patient's tilted molar, particularly if prosthetic rehabilitation is intended. These include angular bone loss, inflammation, and an apparent pocket at the mesial surface of a tipped mandibular molar, all of which are symptoms of worsening periodontal health. To prevent functional and anatomical disruptions, the loss of a permanent first molar should be addressed with a prosthetic replacement.

In order to create an acceptable path of insertion for a dental prosthesis, it is necessary to over-prepare the mesial side of the tilted molar, which could result in unwanted pulp exposure. Orthodontic molar uprighting, therefore, is the treatment of choice to create proper space for prosthetic replacement of a missing permanent first molar, while maintaining or improving the periodontal environment in that area. When the first molars are extracted and patients are referred from the prosthodontic clinic to the orthodontic clinic for the management of a mesially tilted second molar, orthodontic therapy should be focused on helping the restorative process as opposed to addressing the overall malocclusion of other teeth.

One of the oldest ways to upright a tilted molar is the use of a conventional molar uprighting spring introduced by Burstone in 1966. This method is a segmental approach, where the spring is manually made by creating a loop in a heavy rectangular stainless-steel wire and hooking it on the anchorage teeth segment while engaging the tipped molar for uprighting. Disadvantages of this spring include the need for segmental orthodontic bonding, molar extrusion, intrusion of the anchoring teeth, and a reliance on the clinician's skills in forming a proper spring and complex bends.

Another molar uprighting spring was introduced in the 1990's by Franz Günter Sander and was claimed to eliminate molar extrusion upon uprighting through use of a vertical slot placed on the wire of the anchorage teeth. Its disadvantages include the need for sectional or segmental bonding while adjusting the length of the spring to fit between the anchorage teeth, and that it is not readily available in the orthodontic clinic nor can be lab fabricated, thus it needs to be purchased from the manufacturing company. Also, another disadvantage would be that the amount of molar uprighting cannot be adjusted, the uprighting angle is fixed by the manufacturer and cannot be increased nor decreased to accommodate for different tilted molars scenarios.

Temporary anchorage devices (TAD's) are commonly used to facilitate easier and more efficient orthodontic tooth movement. Recent methods for uprighting molars included the use of TAD's to aid in anchorage while utilizing elastomeric chains to deliver uprighting forces to the molar. Disadvantages of this method include the unpredictability and uncontrolled forces of the system, invasiveness due to the use of Mini screws, and the clinician being required to activate the elastomeric chains frequently due to rapid force decay of the elastomers after initial engagement.

Thus, an improved dental appliance solving the aforementioned problems is desired.

SUMMARY

The present disclosure is directed to a dental appliance. The dental appliance includes a first band adapted for mounting about a first tooth, such as a second molar, the first band having a mesial hook facing toward a root of the first tooth. A second band is included, the second band adapted for mounting about a second tooth, such as a premolar, wherein the second band has a distal hook facing toward a crown of the second tooth. A spring is secured to, and extends between, the distal and mesial hooks. The spring may be a nickel titanium coil spring and have a length of about 13 mm.

In an embodiment, the dental appliance further includes a third band adapted for mounting about a third tooth, such as a premolar. In this embodiment, a rigid bar, such as a lingual arch, is connected to the third band and the second band.

In another embodiment, the third band has a second distal hook facing toward a crown of the third tooth, such as a premolar. A fourth band is included and adapted for mounting about a fourth tooth, such as a second molar. The fourth band has a second mesial hook facing toward a root of the fourth tooth. A second spring is secured to, and extends between, the second distal and second mesial hooks. The second spring may be a nickel titanium spring having a length of about 13 mm.

In a further embodiment, the present disclosure is directed towards a method of applying a dental appliance. The method includes mounting a first band on and about a first tooth, wherein the first band has a mesial hook facing toward a root of the first tooth, such as a second molar. A second band is mounted on and about a second tooth, such as a premolar, wherein the second band has a distal hook facing toward a crown of the second tooth. A spring is attached to, and extends between, the mesial and distal hooks.

In an embodiment, the method of applying a dental appliance includes mounting a third band on and about a third tooth, such as a premolar. A rigid bar, such as a lingual arch, is mounted in connection with the third band and the second band.

In another embodiment, the third band has a second distal hook facing toward a crown of the third tooth. A fourth band is mounted on and about a fourth tooth, such as a second molar. The fourth band has a second mesial hook facing toward a root of the fourth tooth. A second spring is mounted to, and extends between, the second distal and second mesial hooks. The second spring may be a nickel titanium coil spring having a length of about 13 mm.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
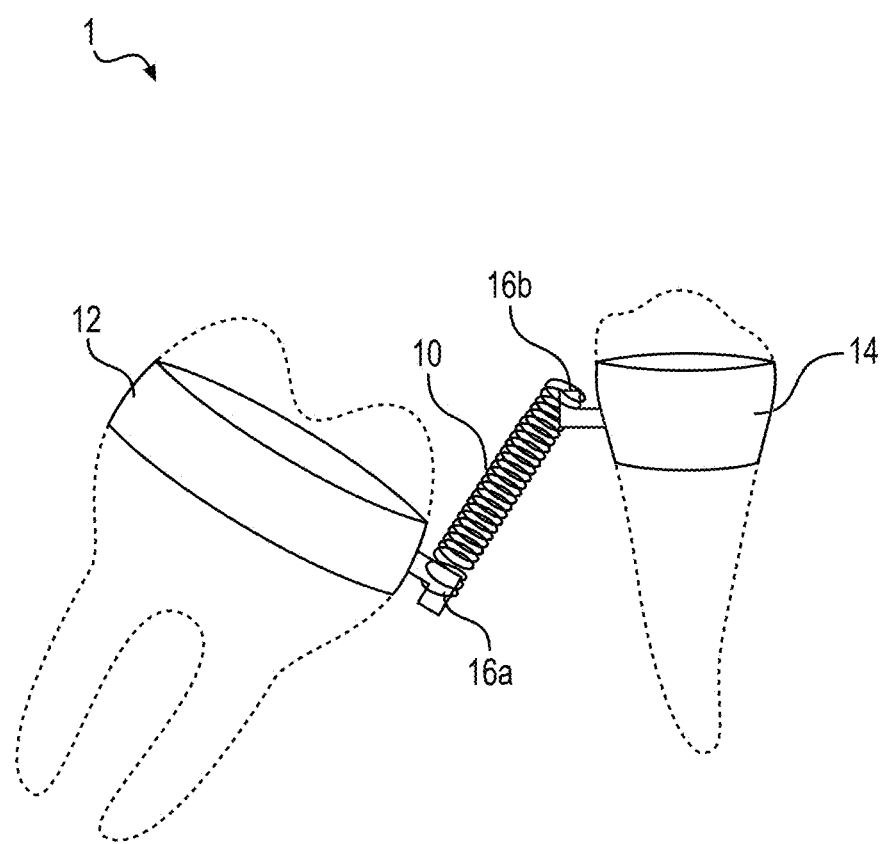
FIG. 1 is an environmental perspective view of a first embodiment of the dental appliance.

FIG. 1 shows a first embodiment of the dental appliance 1. The dental appliance 1 includes a first band 12 adapted for mounting about a first tooth, such as a mesially tipped second molar, the first band 12 having a mesial hook 16a facing a first direction. In a particular embodiment, the first direction is toward a root of the first tooth. A second band 14 is included, the second band adapted for mounting about a second tooth, such as a premolar, wherein the second band has a distal hook 16b facing a second direction different from the first direction. In a particular embodiment, the second direction is toward a crown of the second tooth. As used herein, elements may be "adapted for mounting" or "configured to be mounted," with both phrases having the same meaning within the scope of the present disclosure.

A spring 10 is secured to, and extends between, the mesial and distal hooks 16a, 16b. Spring 10 may be, for non-limiting example, a nickel titanium (NiTi) coil spring having a length of about 13 mm, which approximates the average space needed to restore a missing first molar (as used herein, the term "about" refers to a ±10% variation from the nominal value, unless otherwise indicated or inferred). Nickel titanium coil springs may be desirable for their shape-memory and elasticity. The shape memory of an NiTi coil spring allows the spring to return to its original shape and length after compression and activation, and provides for force delivery to uprighten the tilted molar. It is understood that the dimensions and materials of the spring 10 are for illustrative purposes and are not meant to be limiting to the present disclosure, as other dimensions and/or materials could also be used for the spring 10.

When the spring 10 is first attached to the distal hook 16b, it is inactive or passive in a straight position. Upon being hooked onto the mesial hook 16a, the spring 10 is deflected, compressed and rendered active. This compression of the spring 10 is what exerts the pushing forces onto the tilted second molar to uprighten it. When the spring 10 is compressed, its length decreases, and the spring 10 forcibly tries to regain its original length (such as, for example, about 13 mm), thereby exerting enough force to upright the tilted second molar until proper space is achieved for replacing a missing first molar (about 13 mm).

The coil or spring 10 can exert forces that affect the adjacent premolar inversely. Thus, in order to prevent any unwanted movement of the premolar, placement of a rigid bar connection is an option for securing and maintaining the position of the premolar tooth.

Figure 2:
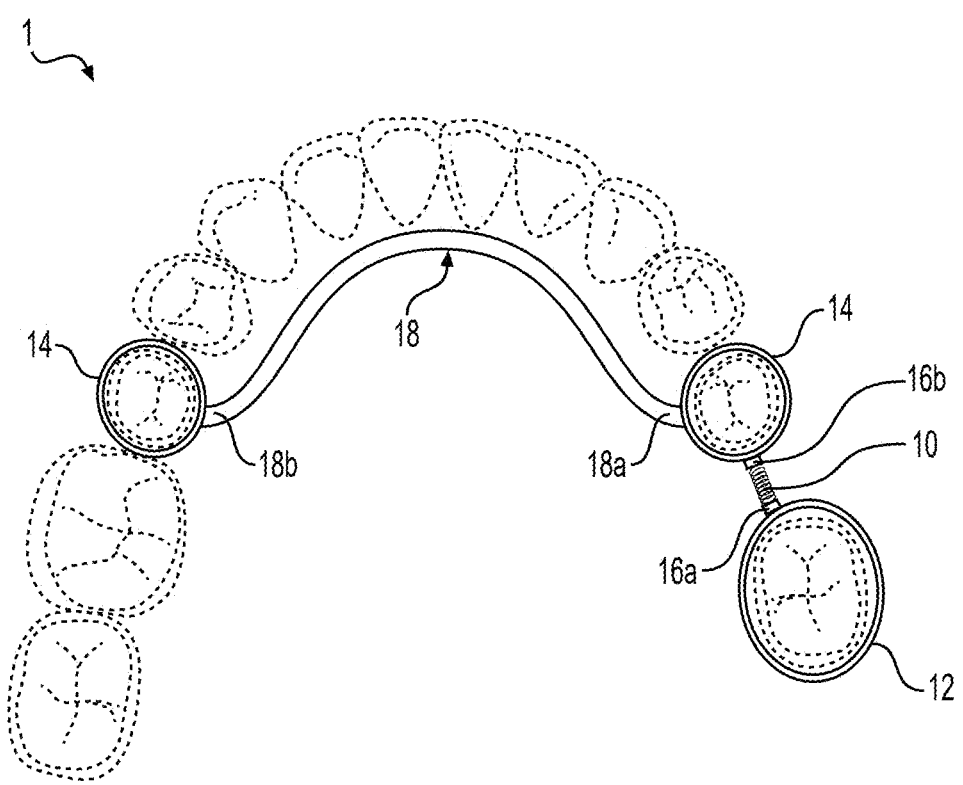
FIG. 2 is an overhead view of a second embodiment of the dental appliance.

Turning to the embodiment of FIG. 2, the dental appliance 1 further includes a third band 20 adapted for mounting about a third tooth, such as a premolar. A rigid bar 18 is connected to the second band 14 at a first end 18a and connected to the third band 20 at a second end 18b. The use of a rigid bar 18 (also sometimes known as a lower lingual holding arch space maintainer, or simply, a lingual arch) prevents space loss and mesial migration of teeth. The rigid bar 18 may be made from a rigid stainless-steel wire that prevents the mesial or forward migration of teeth through resting on the lingual surface of the anterior teeth. Through this design, the effect of forces on a premolar tooth are reduced to almost none, therefore eliminating the consequence of unwanted movement of the premolar, while directing the forces almost fully to upright the tilted mandibular second molar.

Figure 3:
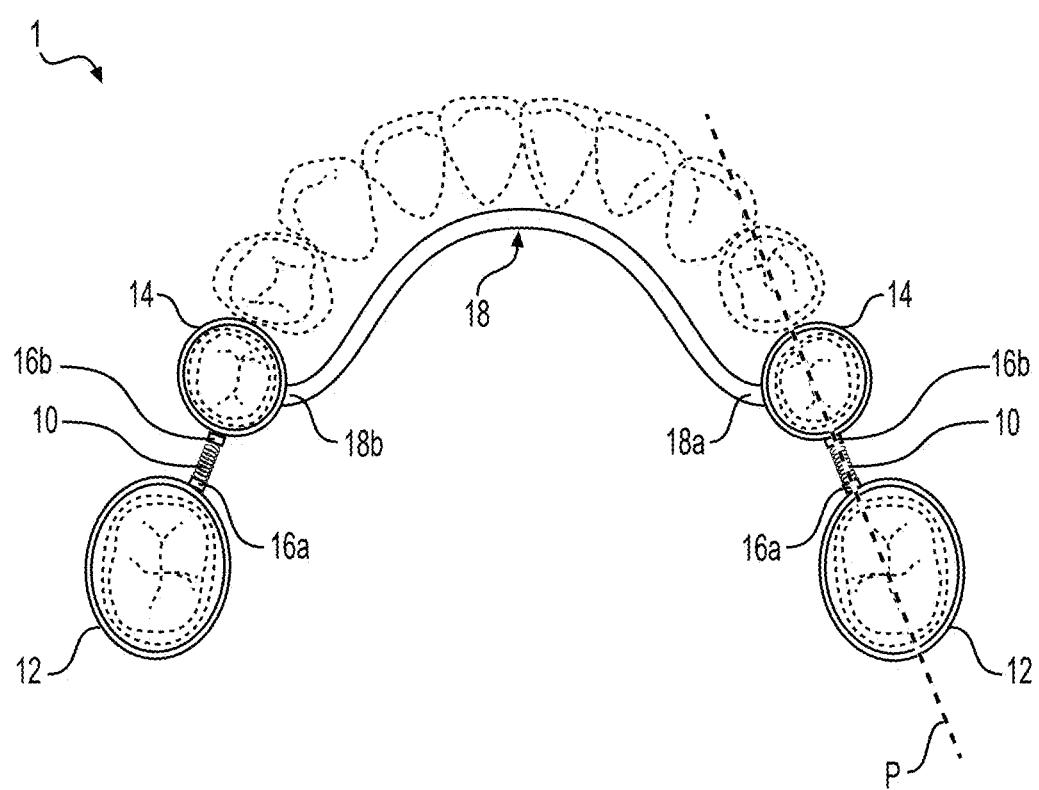
FIG. 3 is an overhead view of a third embodiment of the dental appliance.

In another embodiment, shown in FIG. 3, the third band 20 includes a second distal hook 22a facing toward a third direction different from the first and second directions. In a particular embodiment, the third direction is toward a crown of the third tooth (in a similar manner to distal hook 16b of FIG. 1). A fourth band 26 is included and adapted for mounting about a fourth tooth, such as a second molar. The fourth band 26 includes a second mesial hook 22b facing toward a fourth directions different from the first, second and third directions. In a particular embodiment, the fourth direction is toward a root of the fourth tooth (in a manner similar to mesial hook 16a of FIG. 1). A second spring 24 is secured to, and extends between, the second distal hook 22a and the second mesial hook 22b. In a non-limiting embodiment shown in FIG. 3, the mesial hook 16a, distal hook 16b, and first spring 10 may be axially aligned with a plane P passing through the occlusal surface of the first and second tooth, respectively. Similarly, in a further non-limiting embodiment, the third and fourth hooks 22a, 22b may be axially aligned with a plane (not shown) passing through the occlusal surface of the third and fourth tooth, respectively.

An advantage of the dental appliance disclosed herein is the ability for the direction of forces to pass closely through the center of resistance of a molar tooth in three planes of space, including the bucco-lingual, mesio-distal and vertical dimensions. Thus, a reduction is provided in unpredictable moments, movements, and forces subjected on the tooth and allowing for a more controlled and predictable molar uprighting process.

Figure 4:
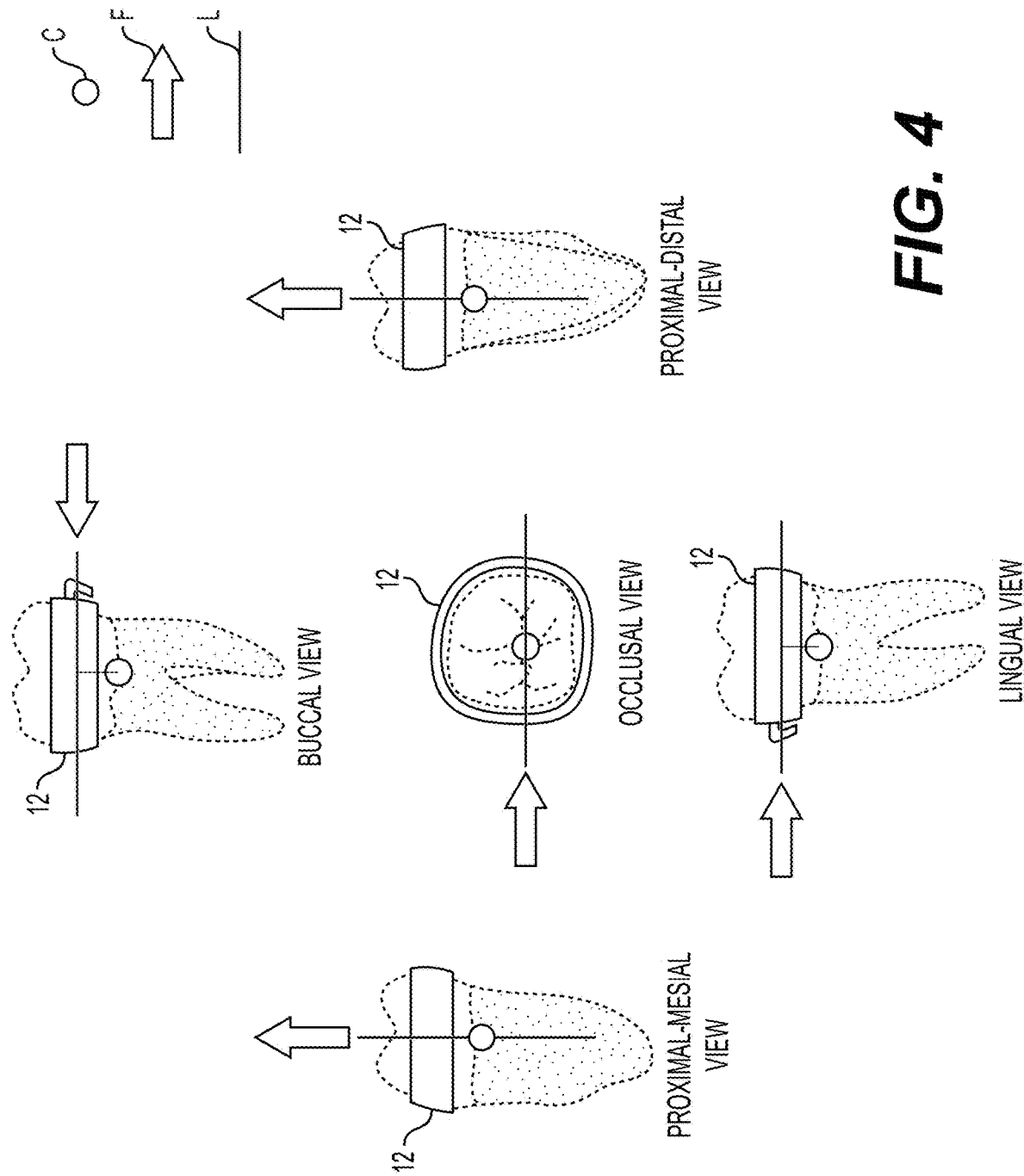
FIG. 4 is an environmental perspective view of the forces applied to a molar through use of the dental appliance.

Turning to FIG. 4, an example molar is shown having a center of resistance C. Arrows F are provided indicating a direction of forces exerted from the coil spring. Lines L show the line of forces passing closely through the center of resistance of the tooth in three planes of space (the bucco-lingual, mesio-distal and vertical), thus producing a controlled molar uprighting which reduces possible undesired movements.

It is to be understood that the dental appliance is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A dental appliance, comprising:
    a first band adapted for mounting about a first tooth, wherein the first band has a mesial hook facing toward a first direction;
    a second band adapted for mounting about a second tooth, wherein the second band has a distal hook facing toward a second direction, the second direction being a different direction than the first direction; and a spring secured to, and extending between, the mesial and distal hooks, wherein the mesial hook, the distal hook and the spring are axially aligned along a first imaginary plane, wherein the first imaginary plane extends through an occlusal surface of the first tooth and through an occlusal surface of the second tooth, wherein the spring is configured to be in compression between the mesial and distal hooks, thereby being configured to push the first and second teeth away from one another, and wherein the first imaginary plane extends through a center of resistance of the first tooth.

2. The dental appliance according to claim 1, wherein the first tooth is a second molar and the second tooth is a premolar.

3. The dental appliance according to claim 1, wherein the spring is a nickel titanium coil spring.

4. The dental appliance according to claim 3, wherein the spring has a length of about 13 mm.

5. The dental appliance as recited in claim 1, further comprising:
a third band adapted for mounting about a third tooth; and
a rigid bar connected to the third band and the second band.

6. The dental appliance as recited in claim 5, wherein the rigid bar is a lingual arch.

7. The dental appliance as recited in claim 6, wherein the third band includes a second distal hook facing toward a third direction different from the first direction and the second direction.

8. The dental appliance as recited in claim 7, further comprising:
a fourth band adapted for mounting about a fourth tooth, wherein the fourth band includes a second mesial hook facing toward a fourth direction different from the first direction, the second direction, and the third direction; and
a second spring secured to, and extending between, the second distal and second mesial hooks,
wherein the second mesial hook, the second distal hook and the second spring are axially aligned along a second imaginary plane, different from the first imaginary plane,
wherein the second imaginary plane extends through an occlusal surface of the third tooth and through an occlusal surface of the fourth tooth, and
wherein the second spring is configured to be in compression between the second mesial and second distal hooks, thereby being configured to push the third and fourth teeth away from one another.

9. The dental appliance as recited in claim 8, wherein the third tooth is a premolar and the fourth tooth is a second molar.

10. A method of applying a dental appliance, comprising the steps of:
mounting a first band on and about a first tooth, wherein the first band has a mesial hook facing toward a first direction;
mounting a second band on and about a second tooth, wherein the second band has a distal hook facing toward a second direction different from the first direction; and
attaching a spring to the distal and mesial hooks such that the spring extends between the distal and mesial hooks,
wherein the mesial hook, the distal hook and the spring are axially aligned along a first imaginary plane,
wherein the first imaginary plane extends through an occlusal surface of the first tooth and through an occlusal surface of the second tooth, and
wherein the spring is configured to be in compression between the mesial and distal hooks, thereby being configured to push the first and second teeth away from one another,
wherein the first imaginary plane extends through a center of resistance of the first tooth.

11. The method of applying a dental appliance as recited in claim 10, wherein the first tooth is a second molar and the second tooth is a premolar.

12. The method of applying a dental appliance as recited in claim 10, wherein the spring is a nickel titanium coil spring.

13. The method of applying a dental appliance as recited in claim 12, wherein the spring has a length of about 13 mm.

14. The method of applying a dental appliance as recited in claim 10, further comprising mounting a third band on and about a third tooth; and
mounting a rigid bar in connection with the third band and the second band.

15. The method of applying a dental appliance as recited in claim 14, wherein the third band has a second distal hook facing towards a third direction different from the first direction and the second direction.

16. The method of applying a dental appliance as recited in claim 15, further comprising:
mounting a fourth band on and about a fourth tooth, wherein the fourth band has a second mesial hook facing toward a fourth direction different from the first direction, the second direction and the third direction; and
attaching a second spring to the second distal and second mesial hooks such that the second spring extends between the second distal and second mesial hooks,
wherein the second mesial hook, the second distal hook and the second spring are axially aligned along a second imaginary plane, different from the first imaginary plane,
wherein the second imaginary plane extends through an occlusal surface of the third tooth and through an occlusal surface of the fourth tooth, and
wherein the second spring is configured to be in compression between the second mesial and second distal hooks, thereby being configured to push the third and fourth teeth away from one another.

17. The method of applying a dental appliance as recited in claim 16, wherein the third tooth is a premolar and the fourth tooth is a second molar.

18. The method of applying a dental appliance as recited in claim 16, wherein the second spring is a nickel titanium coil spring having a length of about 13 mm.

* * * * *